Patented Jan. 5, 1932

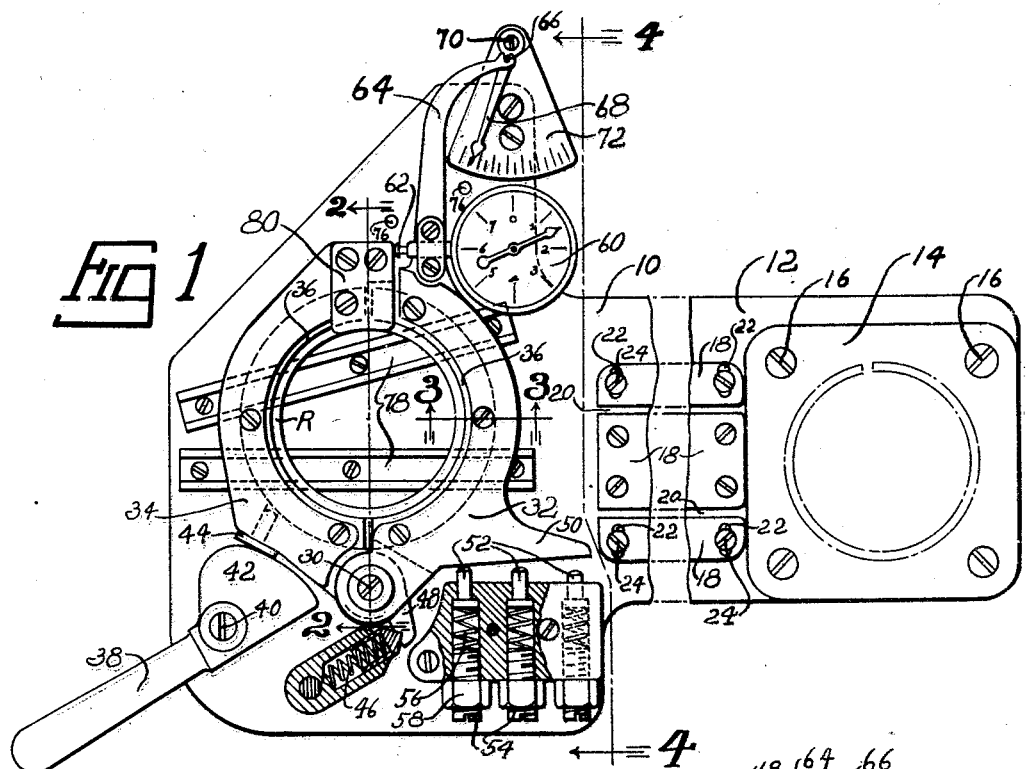

1,840,118

UNITED STATES PATENT OFFICE

ELMER E. MARLIN, OF DETROIT, MICHIGAN

TESTING MACHINE

Application filed October 14, 1927. Serial No. 226,164.

This invention relates to a testing device and more particularly to a device for testing piston rings or like objects.

In the manufacture of piston rings it is important that the rings are flat so that they fit the piston ring groove in the piston and as they accurately fit the groove it is important that their width be held within close limits. It is desirable to have a given spring tension of the ring on the cylinder wall and to provide a sufficient amount of clearance between the ends of the ring to permit expansion. If the gap between the ends of the ring is too great the blow by gases are permitted to escape.

It is therefore an object of this invention to provide a device for testing piston rings which accurately checks each ring for the above features, namely; its flatness, thickness, spring tension at a given diameter and the width of its gap at that given diameter.

Another object of the invention is to group the above testing means into a single device for the purpose of simplifying the construction and testing the piston for more than one feature by the operation of a single device.

These and other objects of the invention will more fully appear from the following description taken in connection with the accompanying drawings, in which:

Fig. 1 is a plan view of the device showing a preferred form of my invention, parts being broken away.

Fig. 2 is a fragmentary sectional view taken on line 2—2 of Fig. 1.

Fig. 3 is a sectional view thru one of the ring retaining members taken on line 3—3 of Fig. 1.

Fig. 4 is a sectional view on line 4—4 of Fig. 1 with the major portion of my invention in side elevation.

Referring to the drawings, I have shown a base 10 having a lateral portion 12 to which is secured a flat surface plate 14. The surface plate is shown detachably secured as by screws 16. Adjacent the surface plate and secured to the upper surface of the base 10, between the major portion of the base and plate 14, are three detachable blocks 18 spaced to form grooves 20.

The two side blocks may be adjustably secured, as by screws 24 extending thru slots 22, so that the blocks may be moved laterally to vary the width of the grooves 20. A single block may be provided having a groove or grooves milled therein but as such would not be adjustable the three blocks are preferred. Two grooves have been shown having different widths, commonly termed a "go" and a "no go" groove, forming gauges for testing the width of the piston rings.

The portion of my invention for testing the tension of the ring and the width of the gap is located adjacent the blocks 18 and on the main portion of the base 10. Pivoted at a common point on a pin 30, screw threaded into the base 10, are two semicylindrical members 32 and 34 which receive the ring to be tested. A semicylindrical ring 36 has been secured to each of the members 32 and 34 for engagement with the outer periphery of the piston ring shown in position as at R. The detachable ring 36 has been provided to permit replacement thereof so that piston rings of various size may be tested by the same device. An actuating member in the form of a handle 38 is pivoted as at 40 to the base 10 and a cam end 42 is adapted to engage a wear plate 44 in the member 34. By moving the handle in one direction the member 34 is urged toward the member 32 compressing the piston ring therebetween. A spring pressed plunger 46 engages an arm 48 on the member 34 to return it to open position when the handle 38 is moved in the opposite direction.

As the piston ring is urged against the member 32 and as it is pivoted on the pin 30 the two members and the ring pivot about the pin 30. A projection 50 on the member 32 engages a resilient tension means whereby further movement of the member is progressingly retarded and the piston ring R is compressed in proportion to the retardation and the tension on the piston ring is equal to the tension of the retarding means. I have shown as a retarding means three spring pressed plungers 52 adapted to successively engage the projection 50. Screw threaded members 54, forming abutments for the inner ends of the springs 56, may be moved inwardly or outwardly to vary the spring tension. Lock nuts 58 hold the screws in adjusted position.

The retarding means may be operated by the use of a single spring pressed plunger but it is preferred to have the three plungers as shown due to the limited movement of the parts and the sudden rise in tension.

Carried on the member 32 is a micrometer gauge 60, having its plunger 62 adapted for engagement with the member 34, for measuring the relative movement between the two members 32 and 34 thereby determining a position where the piston ring has a diameter equal to that of the cylinder wall in which the same is to be used.

An arm 64 carried by the member 32 is adapted to engage a pin 66 on an indicating arm 68 pivoted at 70 to multiply and indicate the movement of the member 32 indicating the resultant pressure on the member 32. A plate 72 secured to an upright projection 74 on the base 10 is graduated so that the pounds pressure on the member 32 may be read. A stop 76 has been shown to limit the movement of the parts.

Channel members 78 have been provided on the base 10 below the members 32 and 34 to form a bearing surface for the members 32 and 34 and the piston ring R. If desired the surface plate 14 may be positioned below the members 32 and 34 to form a bearing therefor and the piston ring may be tested between the two members for its flatness. However, the construction shown is preferred as it prevents dirt or small particles from collecting underneath the moving members. A plate 80 has been secured to the end of the member 34 overlapping the end of the member 32. This plate forms an abutment for the plunger 62 and engages the upper surface of the piston ring ends to assure alignment thereof when they are brought together.

Referring now to the operation of the device and to the method used in testing a piston ring for its various qualities, the ring is first placed on the surface plate 14 and pressed with the operator's finger to determine whether or not it is flat. It is then rolled thru one of the grooves 20 to determine its thickness. If it passes thru both it is too small, if thru only the larger it is of proper thickness and is then placed between the two members 32 and 34. The ring is pinched between the two members thru pressure on the one member 34 causing both members and ring to be pivoted about the pin 30 and to be resisted by the tension of springs 56 whereby an equal tension is placed on the piston ring indicated by the arm 68 on the plate 72. As the movement of the member 32 is progressingly resisted the member 34 approaches the member 32 bringing the diameter of the piston ring up to that of its cylinder wall. This is determined by taking a zero reading on the gauge 60 which indicates the relative movement of the members. The pressure reading is then taken and is equal to the pressure on the piston ring or its tension when compressed to its working diameter. To determine the distance of the gap, further movement of the handle 38 brings the adjacent ends of the ring together and the relative movement of the members 32 and 34 is measured on the gauge 60 which reading is the width of the gap.

It will be understood that various changes in the construction and arrangement of parts may be made without departing from the spirit of my invention and it is not my intention to limit its scope other than by the terms of the appended claims.

What I claim is:

1. A device of the class described comprising a base, a pair of members having a common pivoted connection to said base and each having semicylindrical inner surfaces adapted to receive a split ring, yielding means for progressingly increasing a resistance against one of said members, means for moving the other of said members toward the first named member to compress a ring therebetween, means for indicating the amount of resistance to said member, and means for indicating the relative movement of said members.

2. A device of the class described comprising a base, a pair of members having a common pivoted connection to said base and each having semicylindrical inner surfaces adapted to receive a split ring, yielding means for progressingly increasing a resistance against one of said members, means for moving the other of said members toward the first named member to compress a ring therebetween, and means for indicating the amount of resistance of said member.

3. A device of the class described comprising a base, a member pivoted to said base, means for resiliently urging said member in one direction, another member pivoted to said base positioned with respect to said first named member to receive a resilient member therebetween, means for uring said last named member toward the first named member to compress the resilient member therebetween whereby the resistance of said resilient member urges said first named member in the same direction against its resilient urging means, and means for indicating the amount of resistance offered by said urging means.

4. A device of the class described comprising a base, a member pivoted to said base, means for resiliently urging said member in one direction, another member pivoted to said base positioned with respect to said first named member to receive a resilient member therebetween, means for urging said last named member toward the first named member to compress the resilient member therebetween whereby the resistance of said resilient member urges said first named member in the same direction against its resilient urging means, means for indicating the amount of resistance offered by said urging means, and means for measuring the relative movement of said members.

5. A device of the class described comprising a base, a pair of members having a common pivoted connection to said base and each having a semicylindrical inner surface adapted to receive an annular split ring, resilient means forming an abutment for one of said members, an indicating device associated with the same member for measuring the resistance of said resilient means when it is moved in a direction to compress said resilient means, and a cam adapted to urge the other of said members toward the first mentioned member to compress said annular split ring whereby both members are moved in the same direction and relative to each other.

6. A device of the class described comprising a base, a pair of members having a common pivoted connection to said base and each having a semicylindrical inner surface adapted to receive an annular split ring, resilient means forming an abutment for one of said members, an indicating device associated with the same member for measuring the resistance of said resilient means when it is moved in a direction to compress said resilient means, a cam adapted to urge the other of said members toward the first mentioned member to compress said annular split ring whereby both members are moved in the same direction and relative to each other, and means for indicatng the amount of relative movement between said members.

7. A device of the class described including a support, pressure applying and pressure resisting members pivotally mounted on said support and adapted to receive a split ring therebetween, means carried solely by said pressure resisting member and engageable with said pressure applying member for indicating relative movement between said members so as to measure the gap of said ring, and apparatus mounted on said support and operable by said pressure resisting member for indicating the amount of pressure applied thereon.

8. A device of the class described including a support, pressure applying and pressure resisting members pivotally mounted on said support and adapted to receive a split ring therebetween, means carried solely by said pressure resisting member and engageable with said pressure applying member for indicating relative movement between said members so as to measure the gap of said ring, a yieldable element normally urging said pressure applying member to an open position and apparatus mounted on said support and operable by said pressure resisting member for indicating the amount of pressure applied thereon.

ELMER E. MARLIN.